United States Patent
Hsu

(10) Patent No.: US 6,555,942 B1
(45) Date of Patent: Apr. 29, 2003

(54) ASSEMBLY TYPE STATOR STRUCTURE HAVING FLAT WIRE WOUND COILS

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

(21) Appl. No.: 10/141,825

(22) Filed: May 10, 2002

(51) Int. Cl.[7] .............................. H02K 3/04; H02K 1/12; H02K 1/00; H02K 1/24
(52) U.S. Cl. ...................... 310/208; 310/208; 310/288; 310/259; 310/194
(58) Field of Search .......................... 310/208, 154.41, 310/154.51, 156.52, 156.63, 218, 217, 216, 254, 288, 259, 194

(56) References Cited

U.S. PATENT DOCUMENTS

| | | | | |
|---|---|---|---|---|
| 3,868,766 A | * | 3/1975 | Framlich | 310/208 |
| 6,011,339 A | * | 1/2000 | Kawakami | 310/208 |
| 6,137,202 A | * | 10/2000 | Holms | 310/180 |
| 6,177,751 B1 | * | 1/2001 | Suzuki | 310/269 |
| 6,404,095 B1 | * | 6/2002 | Hsu | 310/254 |

* cited by examiner

Primary Examiner—Thomas M. Dougherty
Assistant Examiner—Iraj A Mohandesi
(74) Attorney, Agent, or Firm—Rosenberg, Klein & Lee

(57) ABSTRACT

An assembly type stator structure having flat wire wound coils, whereby the occupation ratio of stator coils in stator wire grooves can be enhanced under the working condition of high current. Moreover, an accurate number of turns of coils can be provided so that the counter electro force coefficient $K_E$ of an electromotor or a generator can be precisely controlled, thereby designing a more accurate rated maximal rotation speed for an electromotor or a generator of a certain volume. The flat wire wound coils are wound with a high occupation ratio so that the impedance of copper wire thereof can be reduced. Therefore, an electromotor or a generator using the flat wire wound coils of the present invention can have a higher operational efficiency and a rated maximal operational speed, which can be set more easily.

12 Claims, 11 Drawing Sheets

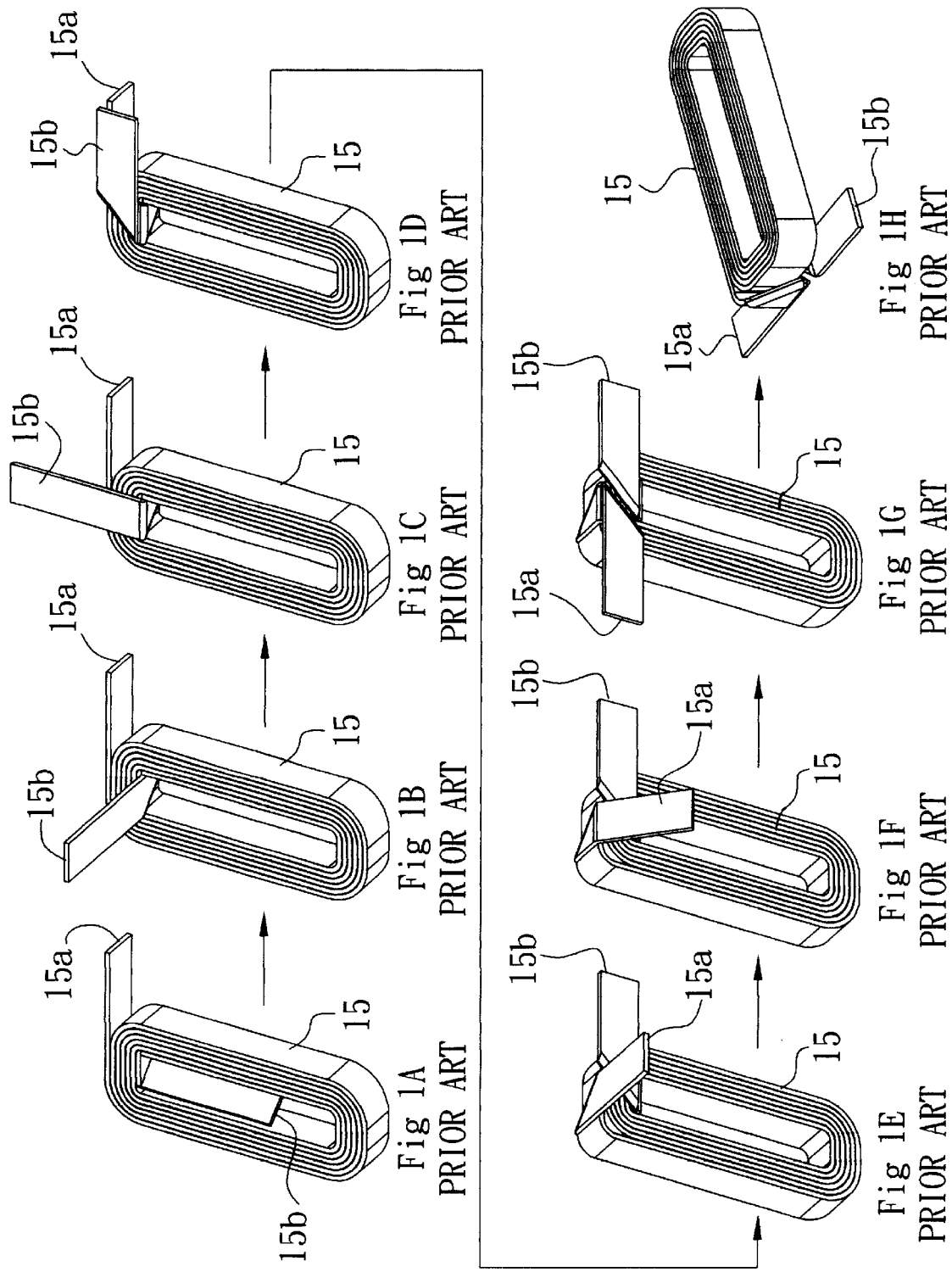

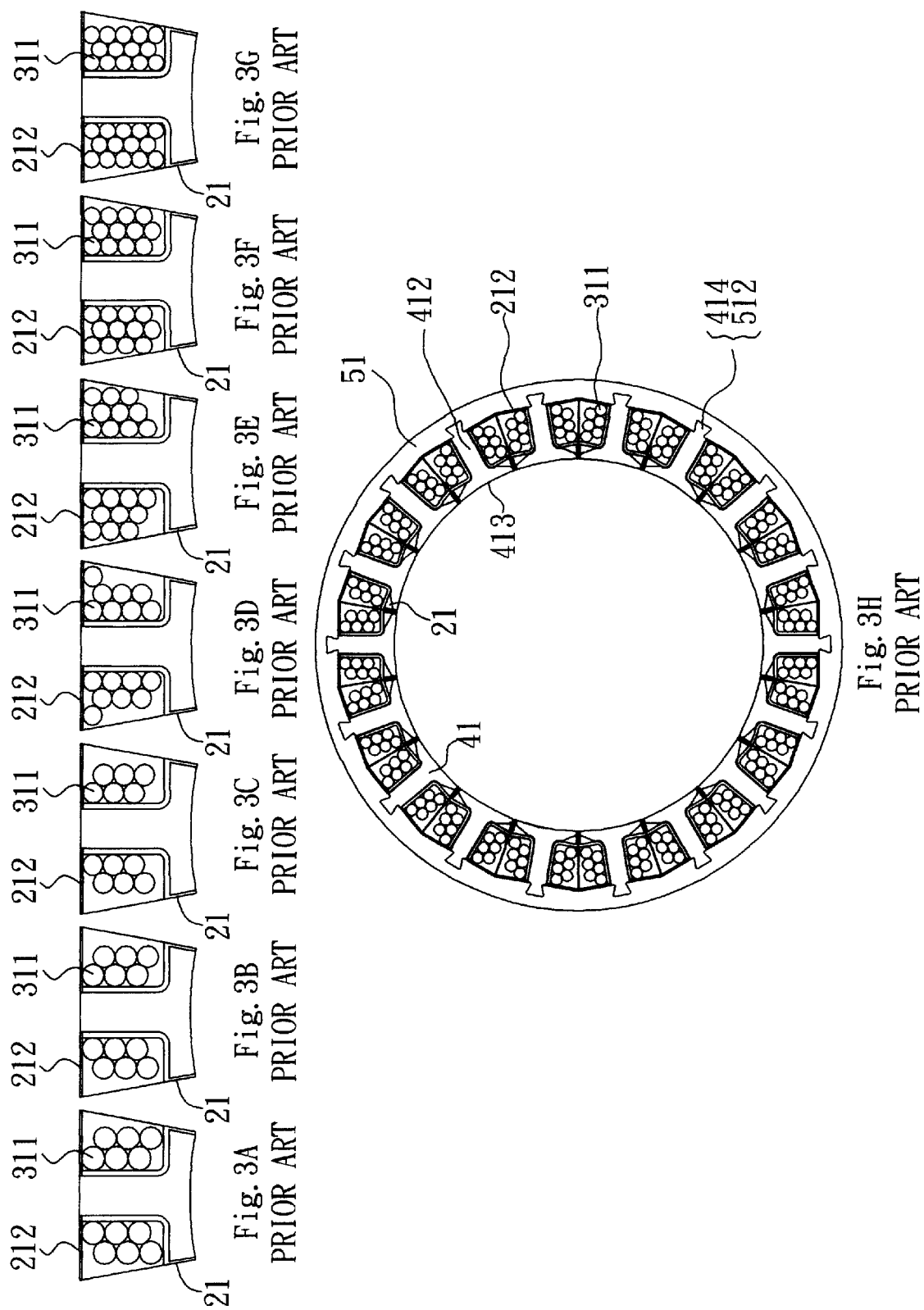

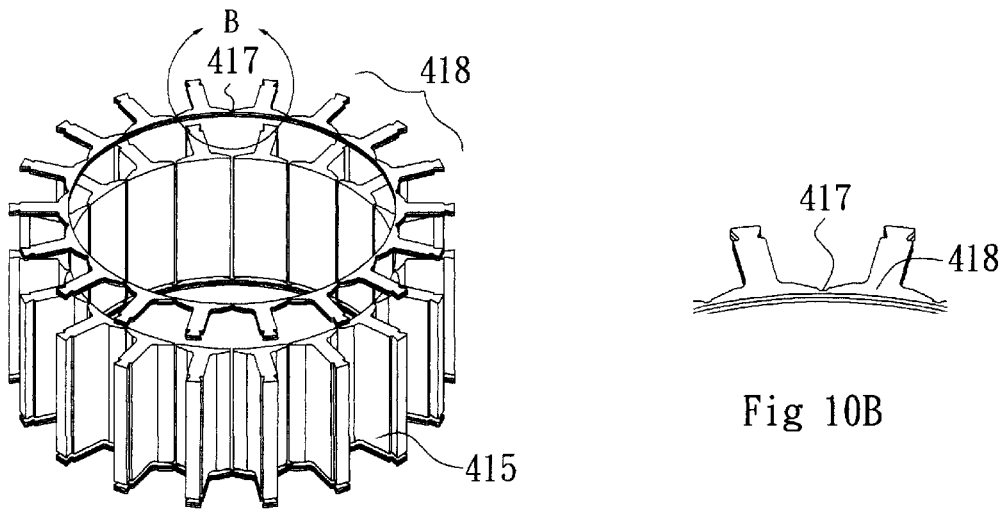
Fig 10A
Fig 10B
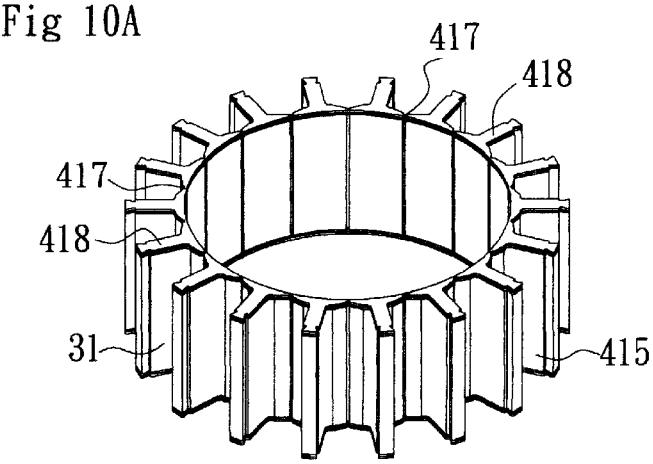
Fig 10C
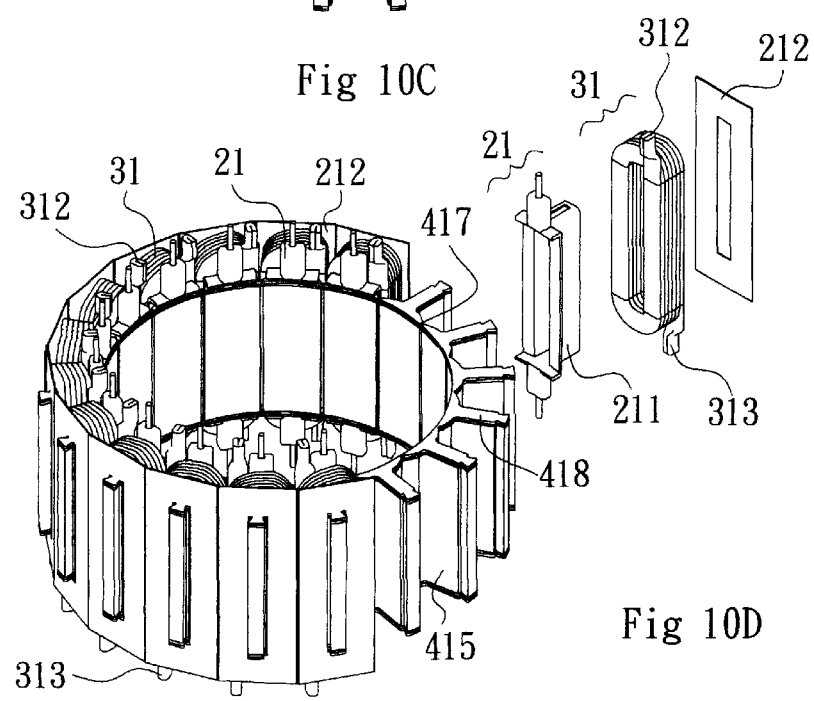
Fig 10D

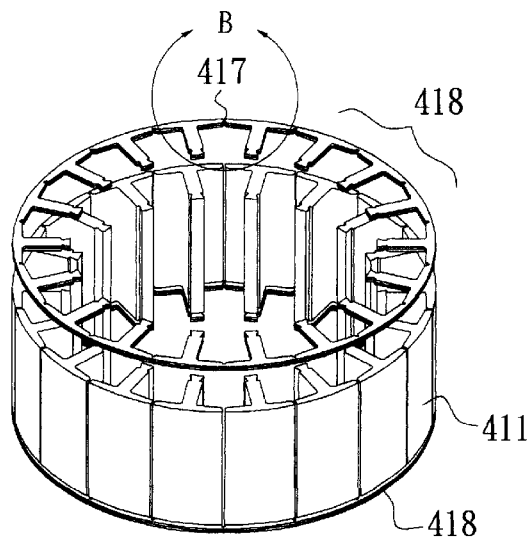
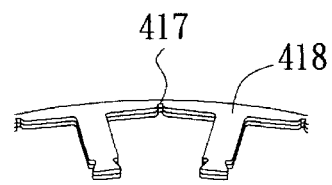
Fig 11A
Fig 11B
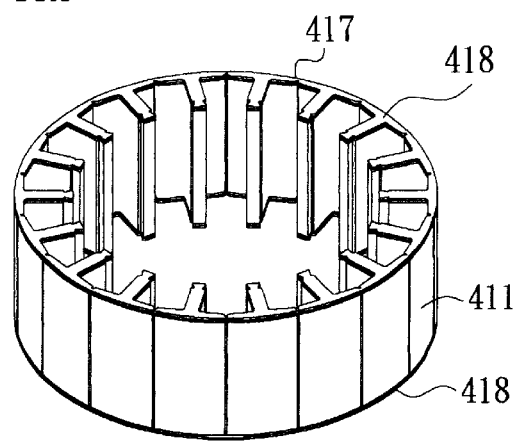
Fig 11C
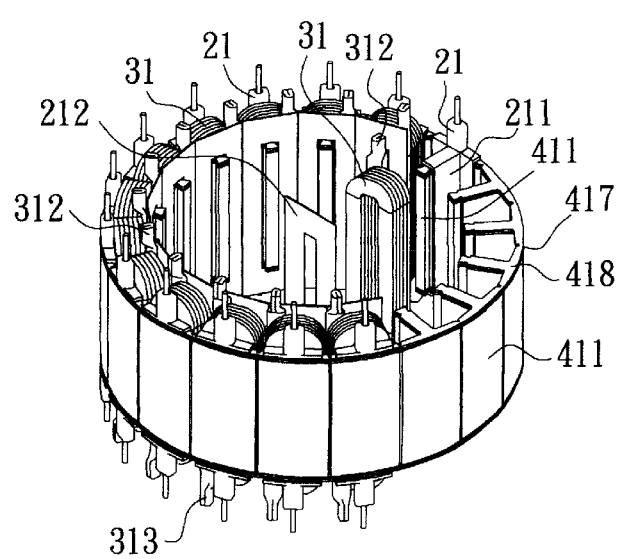
Fig 11D

ASSEMBLY TYPE STATOR STRUCTURE HAVING FLAT WIRE WOUND COILS

FIELD OF THE INVENTION

The present invention relates to an assembly type stator structure having flat wire wound coils, whereby coils, wire groove seats, stator rings, and stator teeth of an electromotor or generator can be separated from the stator.

BACKGROUND OF THE INVENTION

An electromotor or generator must operate at an optimal working point to have the highest operational efficiency. Therefore, it is necessary to accurately control the operational range. From the equation: $E=\Omega \cdot D \cdot B \cdot L \cdot N/2 = \Omega \cdot K_E$, wherein E is the power source voltage, $\Omega$ is the armature's rotation speed, D is the armature's outer diameter, B is the magnetic flux density of air gap, L is the stacked thickness, N is the total number of turns of conductors, and $K_E$ is the counter electro force coefficient, we know that the counter electro force coefficient $K_E$ is inversely proportional to the armature's rotation speed $\Omega$, and $K_E$ also relates the armature's outer diameter D, the magnetic flux density of air gap B, the staked thickness L, and the total number of turns of conductors N. If the armature's outer diameter D, the magnetic flux density of air gap B, and the stacked thickness L are fixed, changing the total number of turns of conductors N will change the rated highest rotation speed. However, as shown in FIGS. 3A to 3G, although coils differ due to different sizes of wire material, only 6 turns of coils can be wound in FIGS. 3A, 3B, and 3C, 8 turns of coils can be wound in FIG. 3D, 10 turns of coils can be wound in FIG. 3E, 12 turns of coils can be wound in FIG. 3F, and 14 turns of coils can be wound in FIG. 3G. Evidently, if it is necessary to wind 7, 9, 11, or 13 turns of coils due to the requirement of the working point, the above figures cannot be chosen and the number of turns of coils in the above figures needs to be discounted, hence reducing the occupation ratio of coils in wire groove seats. Moreover, because there are inevitably gaps existing between circular wire materials, the occupation ratio of coils cannot be highly utilized, hence reducing the cross-sectional area of coils and increasing the impedance of copper wire of coils. From the equation: $P = I^2 \cdot R$, wherein P is the power loss of copper wire of coils, I is the current of coils, and R is the impedance of copper wire of coils, the power loss of copper wire of coils is also increased.

U.S. Pat. No. 5,866,965 discloses a variable reluctance motor having flat wire wound coils, wherein flat wire wound coils 15 are provided. The flat wire wound coils 15 are wound using a cylinder winder and slipped onto stator poles 13. The flat has two corresponding faces, two corresponding sides, and a start winding 15b and a finish winding 15a. The faces are slipped onto the surface of the stator pole 13. One of the two sides is disposed on the flat 13a. The start winding 15b is thus hidden inside a coil formed by winding the flat wire, as shown in FIG. 2 of U.S. Pat. No. 5,866,965. Therefore, it is necessary to perform two times of processing to lead out the start winding 15b, as shown in FIG. 1 of U.S. Pat. No. 5,866,965. The start winding 15b of the flat wire wound coil 15 must be folded and turned three times to be led out. The procedures for leading out the start and finish windings 15b and 15a are shown in FIGS. 1A to 1G of the present invention. Therefore, the processing is difficult, and the cost is high. FIG. 1H of the present invention can be compared with the coil 15 shown in FIG. 1 of U.S. Pat. No. 5,866,965.

Besides, if the motor disclosed in U.S. Pat. No. 5,866,965 is to be applied in occasions of high current, the coil must have a large cross-sectional area. In other words, it is necessary to use thicker flat wire, resulting in difficult processing in folding and turning the start and finish windings three times. Therefore, the disclosure of U.S. Pat. No. 5,866,965 is not suitable to the occasions of high current.

Furthermore, the width of the faces of the flat wire must be slightly smaller than the width of the stator pole 13. Otherwise, the start winding 15b cannot be folded and turned three times and then led out (please refer to FIGS. 1A and 1B of the present invention).

The coil 15 of U.S. Pat. No. 5,866,965 applies to the situation that the thickness of the stator pole 13 of a stator 11 of a variable reluctance motor is larger than the depth thereof, as shown in FIG. 4 of U.S. Pat. No. 5,866,965. Therefore, the coil 15 can still have a reasonable occupation ratio in wire groove. However, if the manufacturing way of coil in U.S. Pat. No. 5,866,965 is applied to stators of the present invention, the occupation ratio will decrease and the flat wire wound coil will become thinner. The coil 15 of FIG. 1G is slipped onto a longitudinal vertical pole end 211 of a wire groove seat 21 in FIG. 2. Because the depth 218 of the vertical pole end 211 is larger than the width 217 thereof, and the width of face of the coil 15 cannot be larger than the width 217 of the vertical pole end 211 (otherwise the start winding 15b cannot be folded and then led out), the occupation ratio of the coil 15 of U.S. Pat. No. 5,866,965 will be much lower than that of the coil 31 in FIG. 4C of the present invention. Simultaneously, the thickness of the side 15d of U.S. Pat. No. 5,866,965 will also be much lower than that of the side 315 in FIG. 4 of the present invention.

The above reduction of occupation ratio of coil will lead to increase of impedance of copper wire. The power loss of copper wire of coil thus also increases to cause a high working temperature of copper wire. Because the impedance of copper wire is proportional to the working temperature of copper wire, the impedance of copper wire will increase proportionally. Therefore, how to increase the occupation ratio of coil in the wire groove to reduce the impedance of copper wire is a very important issue in manufacturing a high-efficiency electromotor or generator.

SUMMARY OF THE INVENTION

For stators of a conventional electromotor or generator, because a high-current working environment is required, thicker circular coils are used in wire groove seats and are wound and arranged in successive layers, as shown in FIGS. 3A to 3H. Even a whole array of wires are adopted, the occupation ratios of various kinds of circular wires in the same wire groove seat will differ due to different sizes of circular wires. Simultaneously, various kinds of numbers of turns of coils cannot be arranged using different circular wires in the same wire groove seat with uniform occupation ratio, as shown in FIGS. 3A to 3G. Much trouble will arise in the design of rotation speed in the working range of an electromotor or a generator due to the above reasons. From the equation: $E=\Omega \cdot D \cdot B \cdot L \cdot N/2 = \Omega \cdot K_E$, we know that the counter electro force coefficient $K_E$ is inversely proportional to the armature's rotation speed $\Omega$, and $K_E$ is proportional to the armature's outer diameter D, the magnetic flux density of air gap B, the staked thickness L, and the total number of turns of conductors N. Therefore, when electromotors or generators of the same volume are designed to be used in different working ranges, change of the total number of turns of conductors N will change the counter electro force coefficient $K_E$.

Based on the above reason, the object of the present invention is to propose an assembly type stator structure having flat wire wound coils, wherein the thickness of flat wire is changed. Because the total thickness of coil end divided by the required number of turns of a flat wire wound coil 31 equals to the thickness of a side 315 of the flat wire wound coil 31 (as shown in FIGS. 4A to 4C), coils of various kinds of numbers of turns can be flexibly designed, and the counter electro force coefficient $K_E$ can be exactly controlled. Moreover, because there is no waste of arrangement gap of wire material, the occupation ratio in wire groove is inevitably higher.

The various objects and advantages of the present invention will be more readily understood from the following detailed description when read in conjunction with the appended drawing, in which:

BRIEF DESCRIPTION OF THE DRAWINGS

FIGS. 1A to 1D show the folding procedures of a start winding 15b of a coil 15 in U.S. Pat. No. 5,866,965;

FIGS. 1E to 1G show the folding procedures of a finish winding 15a of a coil 15 in U.S. Pat. No. 5,866,965;

FIG. 1H is FIG. 1G viewed from another direction, which can be compared with the coil 15 in FIG. 1 of U.S. Pat. No. 5,866,965;

FIGS. 3A to 3G are diagrams showing different occupation ratios and numbers of turns of various kinds of circular coils 311 in the wire groove seat 21;

FIG. 3H is an assembly cross-sectional view of an outer stator of a conventional circular coil 311;

FIGS. 10A to 10D are perspective assembly view of removable radially-outwardly extended stator 415 and teeth-holding closed rings 418 joined together according to a seventh embodiment of the present invention; and FIGS. 11A to 11D are perspective assembly view of removable radially-inwardly extended stators 411 and teeth-holding closed rings 418 joined together according to a eighth embodiment of the present invention.

DETAILED DESCRIPTION OF THE PREFERRED EMBODIMENTS

Figures 2A, 2B, 2C:
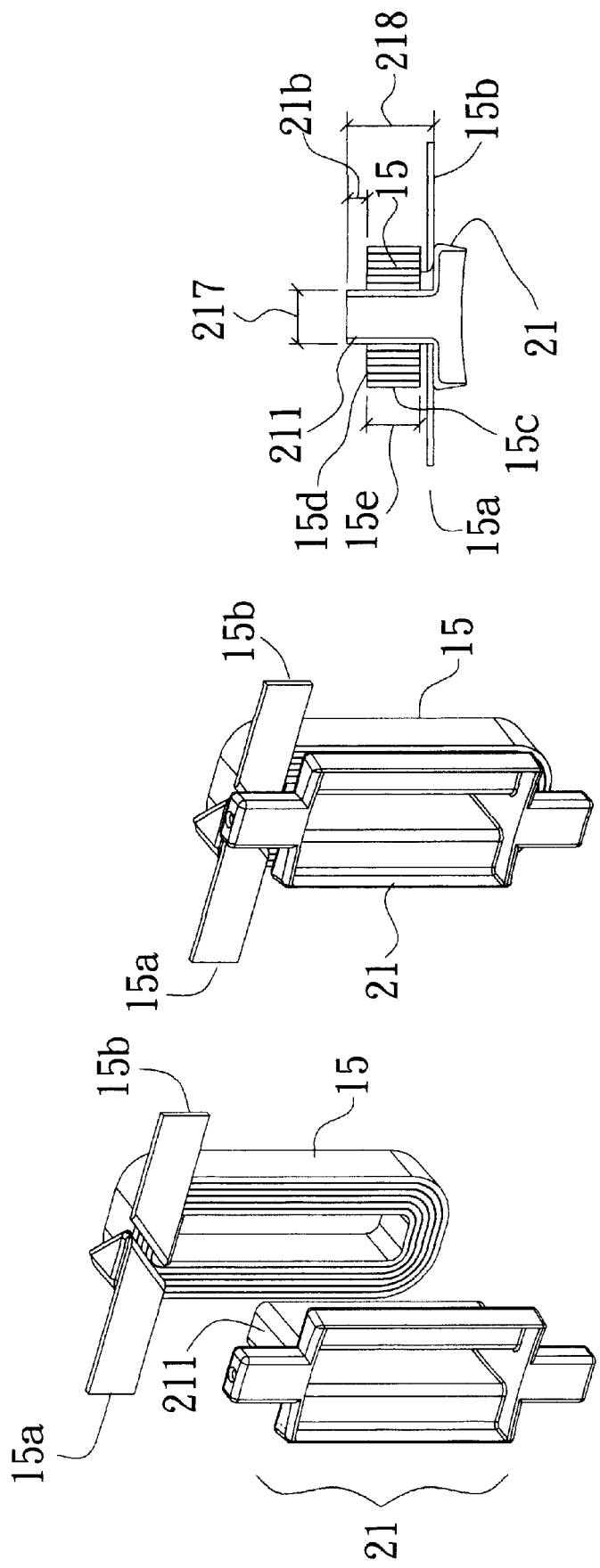
FIGS. 2A and 2B are assembly views of slipping the coil 15 onto a wire groove seat 21 of U.S. Pat. No. 5,866,965.
FIG. 2C is a diagram showing the occupation ratio of slipping the coil 15 onto the wire groove seat 21 of U.S. Pat. No. 5,866,965.
Figure 4A:
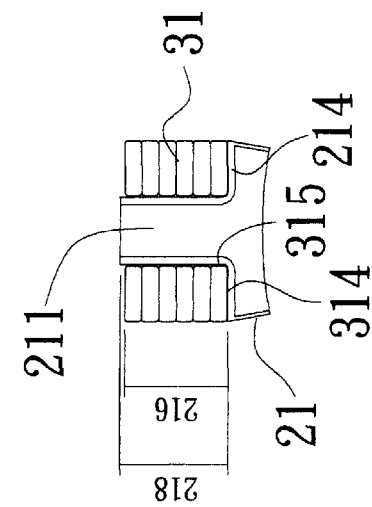
FIGS. 4A to 4C are assembly views of various kinds of flat wires with different thickness and numbers of turns and the wire groove seats of the outer stator of the present invention.
Figure 4B:
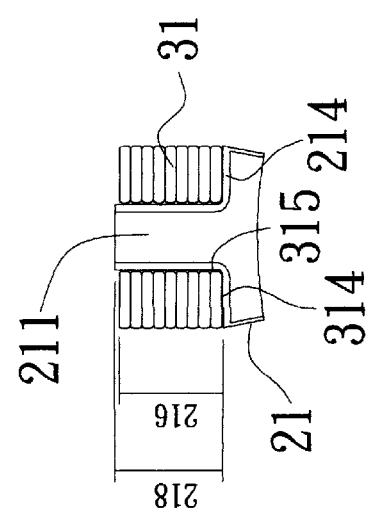
Figure 4C:
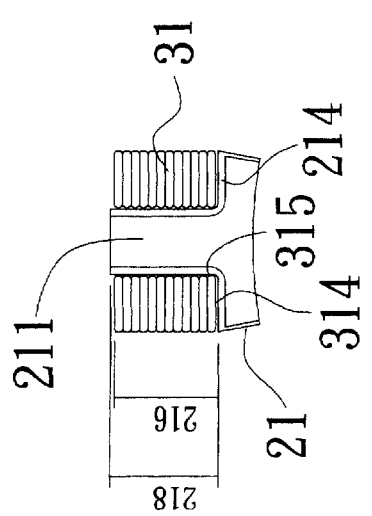
Figures 5A, 5B, 5C:
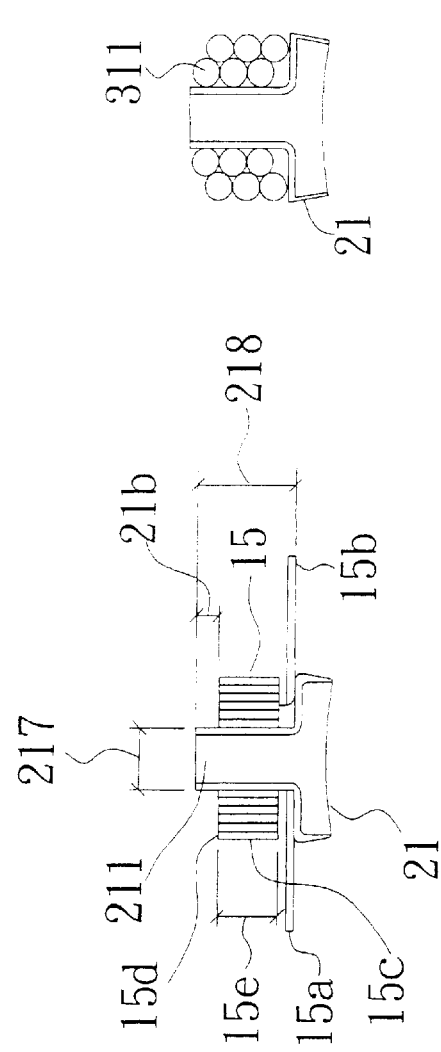
FIGS. 5A to 5C are cross-sectional views respectively showing the coil 15 of U.S. Pat. No. 5,866,965, the circular coil 311 in the wire groove seat 21 and the occupation ratios of the coil 31 of the present invention.
Figure 6A:
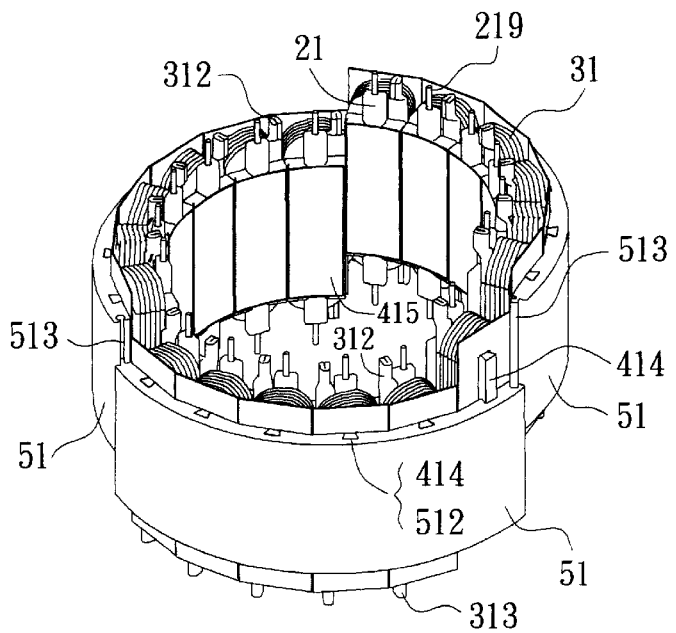
FIGS. 6A and 6B are perspective assembly views of stator rings, stator tooth portions, stator wire groove seats, and flat wire wound coils of an outer stator of the present invention.
Figure 6B:
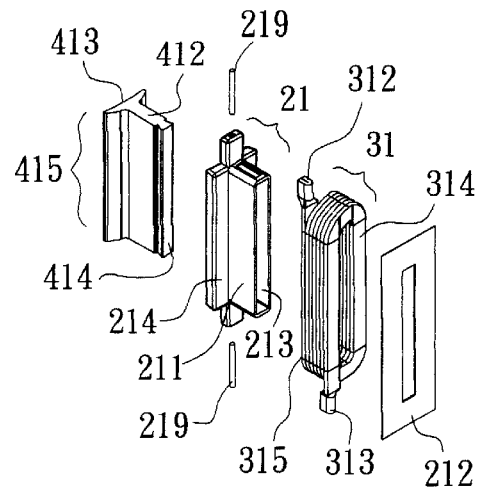
Figure 6C:
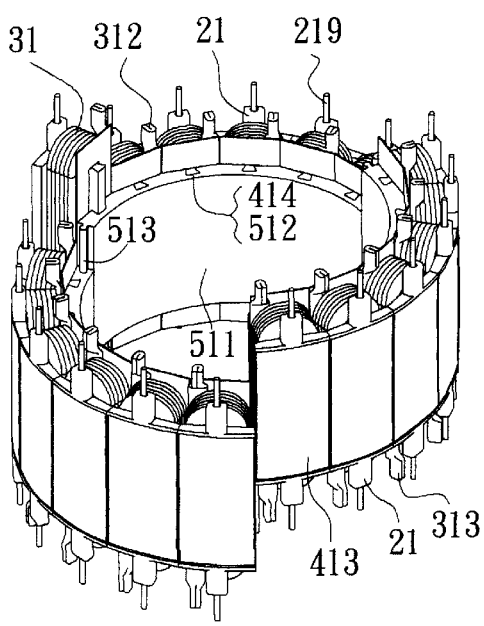
FIGS. 6C and 6D are perspective assembly views of stator rings, stator tooth portions, stator wire groove seats, and flat wire wound coils of an inner stator of the present invention.
Figure 6D:
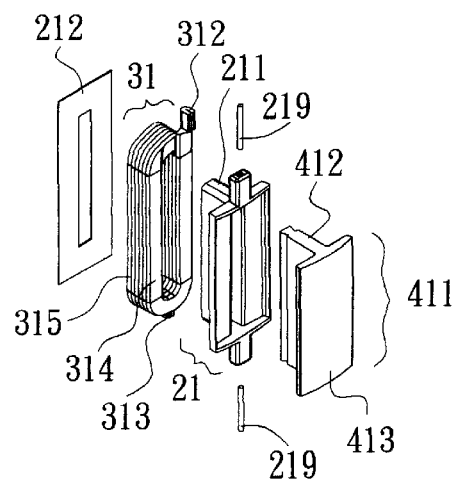
Figure 7A:
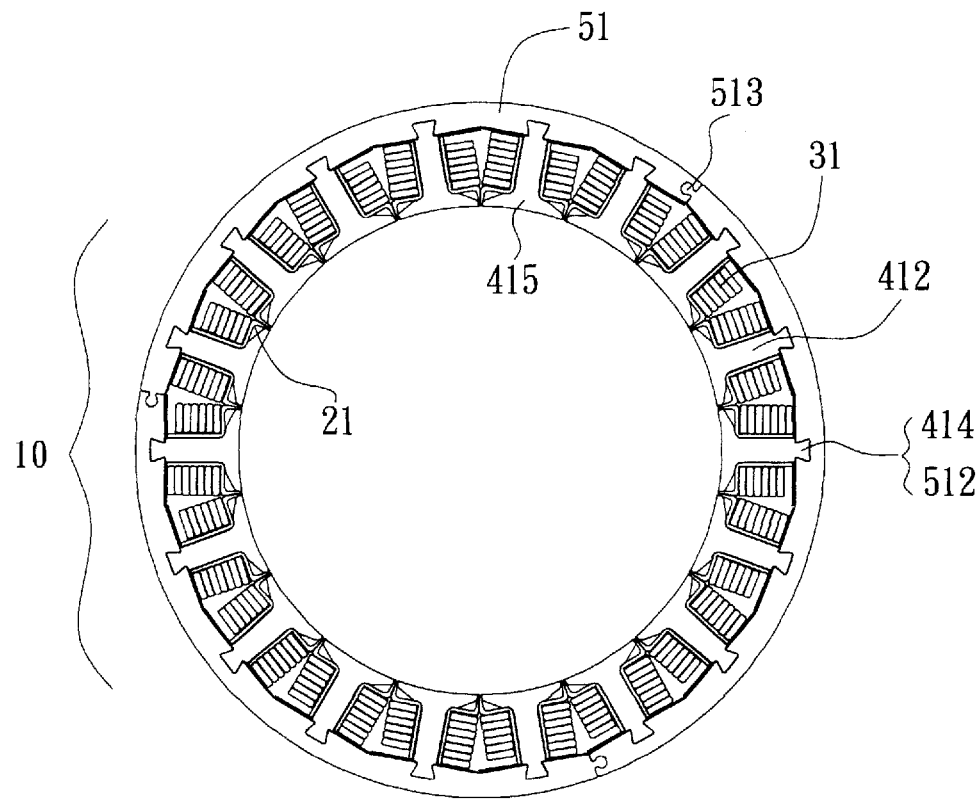
FIG. 7A is a structural cross-sectional view of an assembled outer stator whose rings have recessed and projective embedding ends according to a first embodiment of the present invention.
Figure 7B:
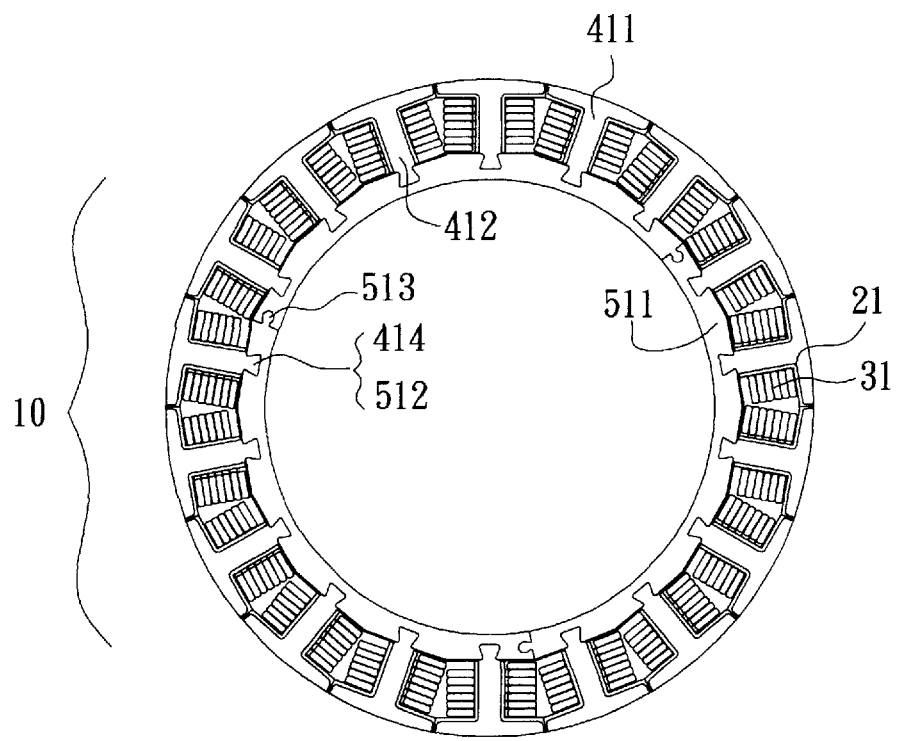
FIG. 7B is a structural cross-sectional view of an assembled inner stator whose rings have recessed and projective embedding ends according to a second embodiment of the present invention.
Figure 8A:
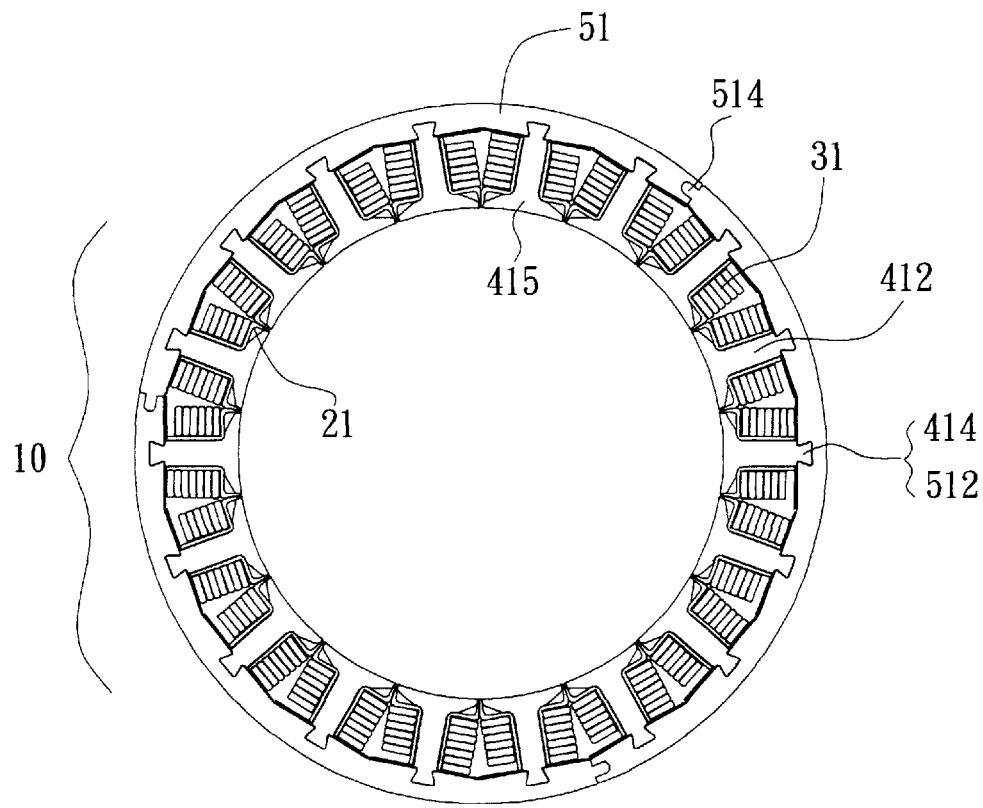
FIG. 8A is a structural cross-sectional view of an assembled outer stator whose rings have recessed and projective embedding ends according to a third embodiment of the present invention.
Figure 8B:
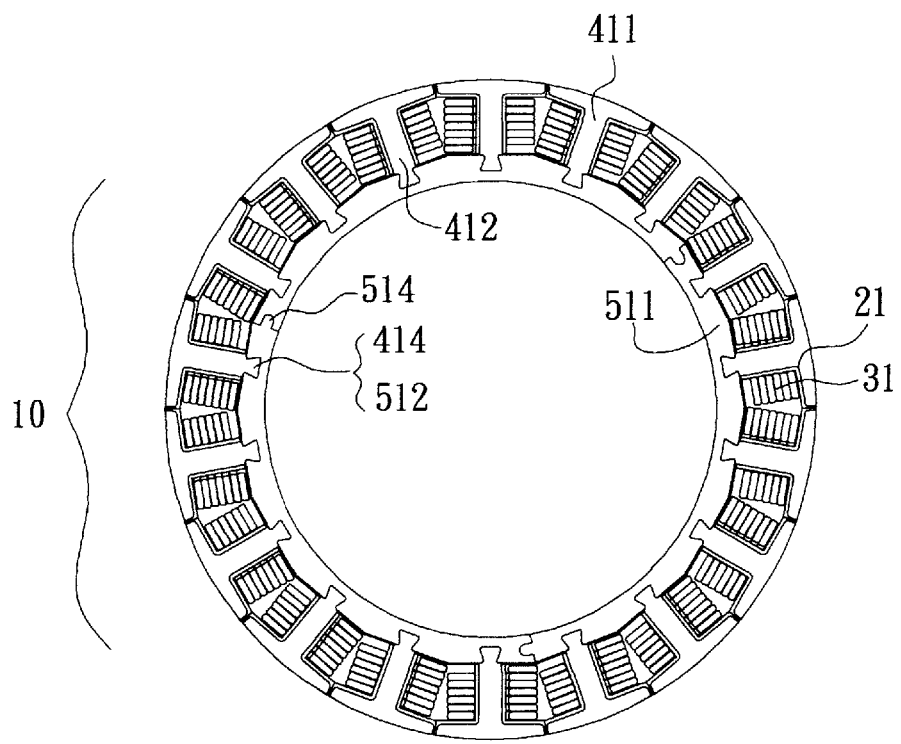
FIG. 8B is a structural cross-sectional view of an assembled inner stator whose rings have recessed and projective embedding ends according to a fourth embodiment of the present invention.
Figure 9A:
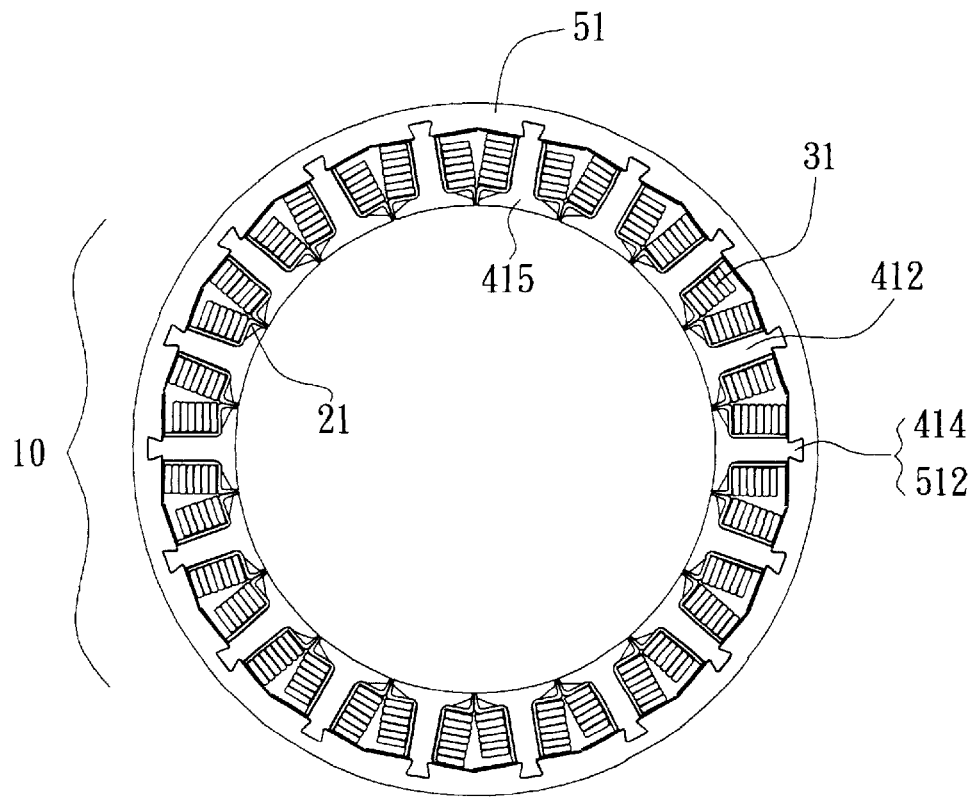
FIG. 9A is a structural cross-sectional view of an assembled outer stator whose rings are integrally formed according to a fifth embodiment of the present invention.
Figure 9B:
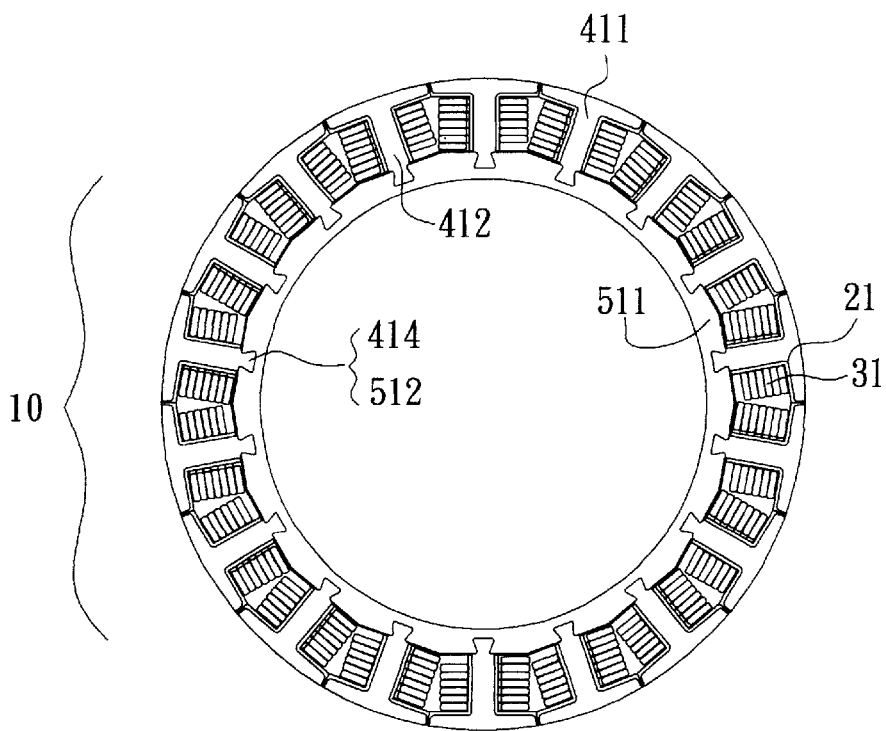
FIG. 9B is a structural cross-sectional view of an assembled inner stator whose rings are integrally formed according to a sixth embodiment of the present invention.

As shown in FIGS. 1 to 11, an assembly type stator structure 10 having flat wire wound coils of the present invention comprises stator rings 51 and 511. The inner edge or outer edge of the stator ring is divided into a plurality of embedding grooves 512 having the same number as stator tooth portions 411 and 415. The embedding grooves 512 are spaced at an equal circumferential angle and recessed toward the direction of the other ring end.

The stator tooth portions 411 and 415 have curved teeth face end. A root end 412 is extended rearwards from the curved face. The distal end of the root end 412 is extended rearwards to form a root rail end 414, which should be not greater than the maximal width of the root end 412. The root tail end 414 also corresponds to and can be slipped into the recessed embedding groove 512 of the stator ring 51 and 511.

A T-shaped wire groove seat 21 is made of insulating material. The flat wire wound coil of an electromotor or a generator is slipped onto a longitudinal vertical pole end 211 of the wire groove seat 21. A hollow shape 213 should be formed in the vertical pole end 211 and can be slipped onto and separated from the stator root end 412. The hollow position is the hollow end 213 of the wire groove seat.

The flat wire wound coil 31 is formed of a flat wire, and has two corresponding faces 314, two corresponding sides 315, a start winding 312, and a finish winding 313. The faces 314 are horizontally laminated at an inside 214 of the vertical pole of the wire groove seat 21. The inner sides are slipped onto the longitudinal vertical pole end 211 of the T-shaped wire groove seat 21 so that the start winding 312 and the finish winding 313 can be exposed.

Moreover, the above flat wire should be bent and laminated in several turns by a coil forming machine with the sides 315 as the bottom of said flat wire wound coil 31 and the stacked face portions 314.

Teeth-holding closed rings 418 are disposed above and below the stator tooth portions 411 and 415. The teeth-holding closed rings 418 are joined together using adjacent teeth-holding ends 417 so that the stator tooth portions 411 and 415 can be joined together using the teeth-holding closed rings 418. The flat wires 31, the T-shaped wire groove seat 21, and an insulating sheet 212 can be installed with a whole stator tooth portions.

The stator tooth portions can be removable radially-outwardly extended stators 415 of an electromotor or a generator.

The stator tooth portions can also be inner stator tooth portions 411 of an electromotor or a generator.

The stator can be an outer stator of an electromotor or a generator. The stator ring is thus the outer stator ring 51, whose inner ring end is divided into the plurality of embedding grooves 512 having the same number as the stator tooth portions. The embedding grooves 512 are spaced at an equal circumferential angle and recessed toward the direction of the outer ring end.

The stator can also be an inner stator of an electromotor or a generator. The stator ring is thus the inner stator ring 511, whose outer ring end is divided into the plurality of embedding grooves 512 having the same number as the stator tooth portions. The embedding grooves 512 are spaced at an equal circumferential angle and recessed toward the direction of the inner ring end.

The stator ring can be decomposed into a plurality of units. Left and right ends of each unit are embedded with left and right ends of an adjacent unit with recessed and projective embedding ends 513. The width of the inner groove of the recessed embedding end should be larger than the width of the rabbet. After the projective embedding end of the adjacent unit is embedded with the recessed embedding groove, they cannot be transversally moved and separated.

The stator ring can be decomposed into a plurality of units. Left and right ends of each unit are embedded with left and right ends of an adjacent unit with recessed and projective embedding ends 514. The width of the inner groove of the recessed embedding end should be smaller than or equal to the width of the rabbet. After the projective embedding end of the adjacent unit is embedded with the recessed embedding groove, they can be transversally moved and separated.

The stator ring (51 and 511 in FIGS. 9A and 9B) is integrally formed in a closed ring shape.

The flat wire wound coils 31 can be exciting coils of an electromotor.

The flat wire wound coils 31 can also be induction coils of a generator.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An assembly type stator structure having flat wire wound coils, comprising:

a plurality of stator tooth portions each having a curved tooth face, a root end being extended rearwards from said curved tooth faces, a root tail end being extended rearwards from a distal end of said root end, a maximal width of said root end being larger than said root tail end;

a stator ring having an inner edge or an outer edge either divided into a plurality of embedding grooves having the same number as the stator tooth portions, said embedding grooves being spaced at an equal circumferential angle and recessed toward the direction of the other ring edge, said root tail end corresponding to and being slipped into said recessed embedding grooves of said stator rings;

a T-shaped wire groove seat made of insulating material, a flat wire wound coil of an electromotor or a generator being slipped onto a longitudinal vertical pole end of said T-shaped wire groove seat, a hollow position being formed in said vertical pole end, said hollow position being slipped onto or separated from said stator root end, said hollow position being a hollow end of said wire groove seat;

said flat wire wound coil formed of a flat wire, said flat wire wound coil having two opposite faces, two opposite sides, a start winding, and a finish winding, said faces being horizontally laminated at an inside of said wire groove seat, said sides being slipped onto said longitudinal vertical pole end of said T-shaped wire groove seat so that said start winding and said finish winding can be exposed, said flat wire being bent and laminated in several turns by a coil forming machine with said sides as a bottom of said flat wire wound coil and said faces as a stacked type.

2. The assembly type stator structure having flat wire wound coils as claimed in claim 1, wherein a plurality of teeth-holding closed rings are disposed above and below said stator tooth portions, said teeth-holding closed rings are joined together using adjacent teeth-holding ends so that said stator tooth portions can be joined together using said teeth-holding closed rings, and said flat wire wound coils, said T-shaped wire groove seats, and insulating sheets can be installed with said stator tooth portions.

3. The assembly type stator structure having flat wire wound coils as claimed in claim 1 or 2, wherein said stator tooth portions are removable radially-inwardly extended stators of an electromotor or a generator.

4. The assembly type stator structure having flat wire wound coils as claimed in claim 1, wherein said stator is an inner stator of an electromotor or a generator, said stator ring is thus an inner stator ring, whose outer ring end is divided into a plurality of embedding grooves having the same number as said stator tooth portions, and said embedding grooves are spaced at an equal circumferential angle and recessed toward the direction of the inner ring end.

5. The assembly type stator structure having flat wire wound coils as claimed in claim 1, wherein said stator ring can be decomposed into a plurality of units, left and right ends of each said unit are embedded with left and right ends of an adjacent unit with recessed and projective embedding ends, the width of the inner groove of said recessed embedding end should be larger than the width of the rabbet, and said recessed and projective embedding ends cannot be transversally moved and separated after said projective embedding end of the adjacent unit is embedded with said recessed embedding groove.

6. The assembly type stator structure having flat wire wound coils as claimed in claim 1, wherein said stator ring can be decomposed into a plurality of units, left and right ends of each said unit are embedded with left and right ends of an adjacent unit with recessed and projective embedding ends, the width of the inner groove of said recessed embedding end should be smaller than or equal to the width of the rabbet, and said recessed and projective embedding ends can be transversally moved and separated after said projective embedding end of the adjacent unit is embedded with said recessed embedding groove.

7. The assembly type stator structure having flat wire wound coils as claimed in claim 1, wherein said flat wire wound coils are exciting coils of an electromotor.

8. The assembly type stator structure having flat wire wound coils as claimed in claim 1, wherein said flat wire wound coils are induction coils of a generator.

9. An assembly type stator structure having flat wire wound coils, comprising:

a plurality of stator tooth portions each having a curved tooth face, a root end being extended rearwards from said curved tooth faces, a root tail end being extended rearwards from a distal end of said root end, a maximal width of said root end being larger than said root tail end, said stator tooth portions being removable radially-outwardly extended stators of an electromotor or a generator;

a stator ring having an inner edge or an outer edge either divided into a plurality of embedding grooves having the same number as the stator tooth portions, said embedding grooves being spaced at an equal circumferential angle and recessed toward the direction of the other ring edge, said root tail end corresponding to and being slipped into said recessed embedding grooves of said stator rings;

a T-shaped wire groove seat made of insulating material, a flat wire wound coil of an electromotor or a generator being slipped onto a longitudinal vertical pole end of said T-shaped wire groove seat, a hollow position being formed in said vertical pole end, said hollow position being slipped onto or separated from said stator root end, said hollow position being a hollow end of said wire groove seat;

said flat wire wound coil formed of a flat wire, said flat wire wound coil having two opposite faces, two opposite sides, a start winding, and a finish winding, said faces being horizontally laminated at an inside of said wire groove seat, said sides being slipped onto said longitudinal vertical pole end of said T-shaped wire groove seat so that said start winding and said finish winding can be exposed, said flat wire being bend and laminated in several turns by a coil forming machine with said sides as a bottom of said flat wire wound coil and said faces as a stacked type.

10. An assembly type stator structure as recited in claim 9 wherein a plurality of teeth-holding closed rings are disposed above and below said stator tooth portions, said teeth-holding closed rings are joined together using adjacent teeth-holding ends so that said stator tooth portions can be joined together using said teeth-holding closed rings, and said flat wire wound coils, said T-shaped wire groove seats, and insulating sheets can be installed with said stator tooth portions.

11. An assembly type stator structure having flat wire wound coils, comprising:

a plurality of stator tooth portions each having a curved tooth face, a root end being extended rearwards from said curved tooth faces, a root tail end being extended rearwards from a distal end of said root end, a maximal width of said root end being larger than said root tail end;

a stator ring having an inner edge or an outer edge either divided into a plurality of embedding grooves having the same number as the stator tooth portions, said embedding grooves being spaced at an equal circumferential angle and recessed toward the direction of the other ring edge, said root tail end corresponding to and being slipped into said recessed embedding grooves of said stator rings;

a T-shaped wire groove seat made of insulating material, a flat wire wound coil of an electromotor or a generator being slipped onto a longitudinal vertical pole end of said T-shaped wire groove seat, a hollow position being formed in said vertical pole end, said hollow position being slipped onto or separated from said stator root end, said hollow position being a hollow end of said wire groove seat;

said flat wire wound coil formed of a flat wire, said flat wire wound coil having two opposite faces, two opposite sides, a start winding, and a finish winding, said faces being horizontally laminated at an inside of said wire groove seat, said sides being slipped onto said longitudinal vertical pole end of said T-shaped wire groove seat so that said start winding and said finish winding can be exposed, said flat wire being bend and laminated in several turns by a coil forming machine with said sides as a bottom of said flat wire wound coil and said faces as a stacked type;

said stator being an outer stator of an electromotor or a generator, said stator ring being an outer stator ring including inner and outer ring ends, said inner ring end having formed therein a plurality of embedding grooves corresponding in number and circumferential angular spacing to said stator tooth portions, said embedding grooves each being recessed toward said outer ring end.

12. The assembly type stator structure having flat wire wound coils as claimed in claim 1, 4, or 11 wherein said stator ring is integrally formed in a closed ring.

* * * * *